US012481191B2

(12) United States Patent
Kitamura

(10) Patent No.: US 12,481,191 B2
(45) Date of Patent: *Nov. 25, 2025

(54) DISPLAY DEVICE

(71) Applicant: Japan Display Inc., Tokyo (JP)

(72) Inventor: Koji Kitamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/792,693

(22) Filed: Aug. 2, 2024

(65) Prior Publication Data

US 2025/0068021 A1  Feb. 27, 2025

(51) Int. Cl.
*G02F 1/1362* (2006.01)
*G02F 1/1368* (2006.01)

(52) U.S. Cl.
CPC .. *G02F 1/136286* (2013.01); *G02F 1/136209* (2013.01); *G02F 1/136227* (2013.01); *G02F 1/1368* (2013.01)

(58) Field of Classification Search
CPC ......... G02F 1/136286; G02F 1/136209; G02F 1/136227; G02F 1/1368; G02F 1/13394
USPC ....................................................... 349/156
See application file for complete search history.

(56) References Cited

U.S. PATENT DOCUMENTS 5,299,289 A * 3/1994 Omae ............... G02F 1/133371
349/5
12,326,628 B2 * 6/2025 Kitamura .............. G02F 1/1368
2007/0146566 A1 * 6/2007 Hosoya ................. G02F 1/1368
349/43
2009/0206332 A1 * 8/2009 Son ..................... H10D 30/6734
257/E29.296
2015/0303225 A1 * 10/2015 Jiang ..................... H10D 86/441
438/158
2021/0026206 A1 * 1/2021 Kurisawa ............... C09K 19/34
2023/0350257 A1   11/2023 Muramoto et al.

FOREIGN PATENT DOCUMENTS

JP   2002341355 A  * 11/2002
WO  2022153665 A1    7/2022

OTHER PUBLICATIONS

Espacenet english machine translation of JP2002341355A (Year: 2002).*
Birendra Bahadur, Liquid Crystals Applications and Uses, 1990, World Scientific, vol. 1, pp. 171-194 (Year: 1990).*

* cited by examiner

*Primary Examiner* — Richard H Kim
*Assistant Examiner* — David Y Chung
(74) *Attorney, Agent, or Firm* — Maier & Maier, PLLC

(57) ABSTRACT

According to one embodiment, a display device includes a first substrate, a second substrate overlapping with the first substrate, and a liquid crystal layer. The first substrate includes a scanning line, a signal line, a switching element electrically connected to the scanning line and the signal line, and an organic insulating film including an aperture and overlapping with the scanning line, the signal line, and the switching element. The organic insulating film includes an upper surface facing the second substrate and a protruding portion protruding from the upper surface onto the second substrate to support the second substrate.

14 Claims, 14 Drawing Sheets

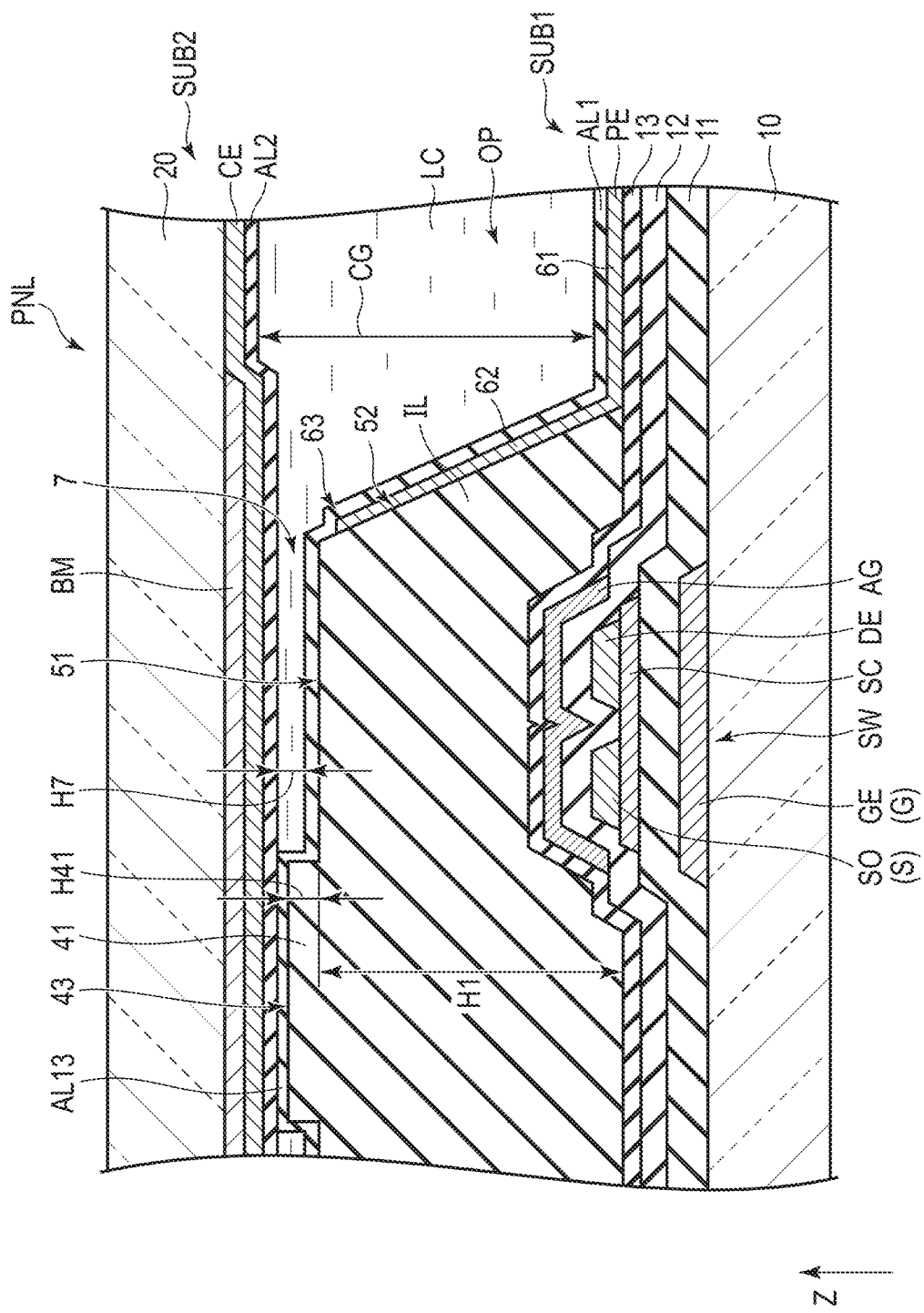
F I G. 13

DISPLAY DEVICE

CROSS-REFERENCE TO RELATED APPLICATIONS

This application is based upon and claims the benefit of priority from Japanese Patent Application No. 2023-136462, filed Aug. 24, 2023, the entire contents of which are incorporated herein by reference.

FIELD

Embodiments described herein relate generally to a display device.

BACKGROUND

In recent years, a display device comprising a display panel including a polymer dispersed liquid crystal layer (PDLC), light sources, and the like has been proposed. The polymer dispersed liquid crystal layer can switch a transparent state in which light is transmitted and a scattered state in which light is scattered, depending on the application of voltage.

BRIEF DESCRIPTION OF THE DRAWINGS

FIG. 13 is a schematic cross-sectional view showing a display panel according to a third embodiment.

DETAILED DESCRIPTION

Figure 1:
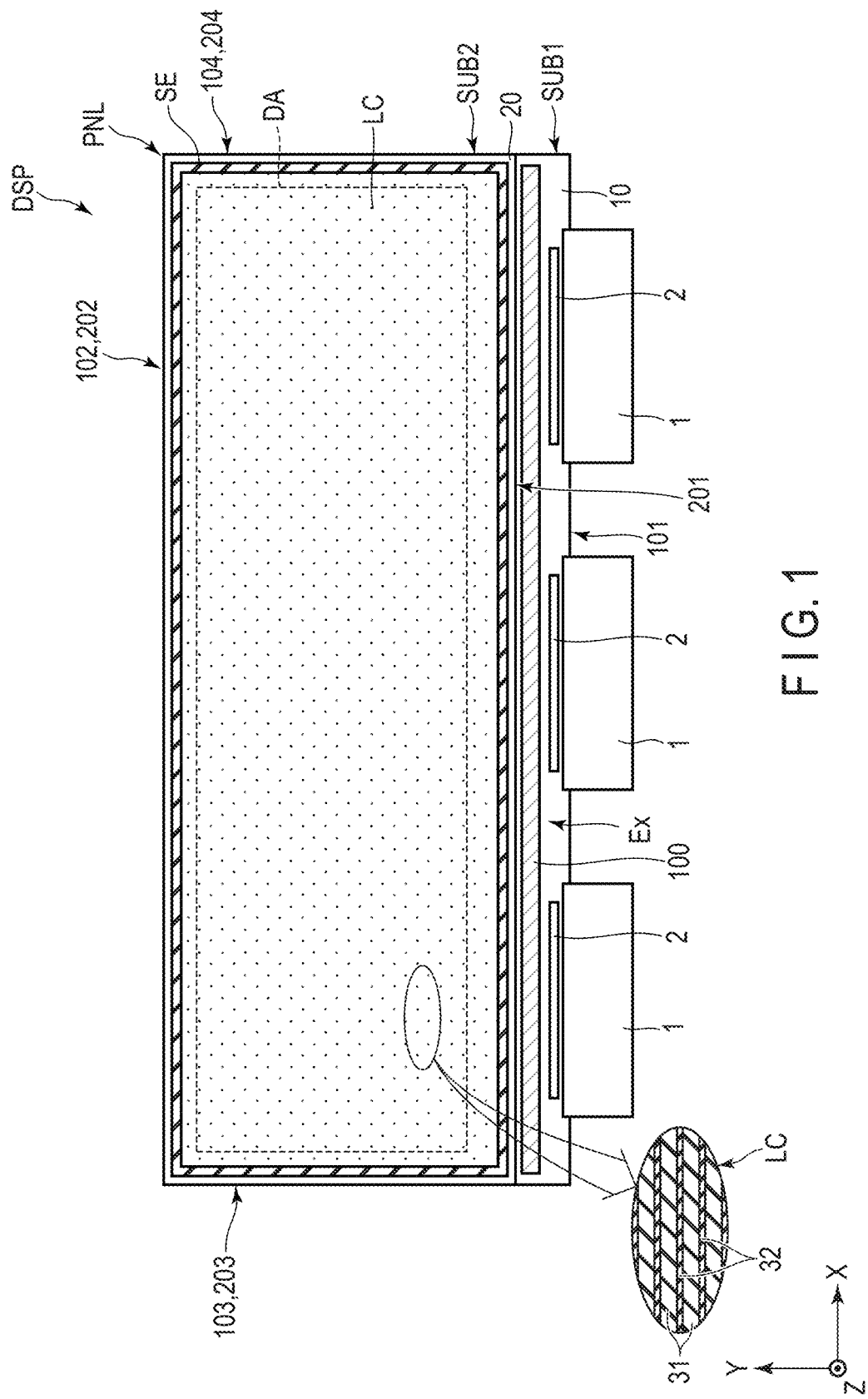
FIG. 1 is a schematic plan view showing an example of a display device according to a first embodiment.

In general, according to one embodiment, a display device includes a first substrate, a second substrate overlapping with the first substrate, a liquid crystal layer located between the first substrate and the second substrate and containing polymer dispersed liquid crystal, and a light emitting element. The first substrate includes a first transparent substrate, a scanning line, a signal line intersecting the scanning line, a switching element electrically connected to the scanning line and the signal line, an organic insulating film including an aperture and overlapping with the scanning line, the signal line, and the switching element, a pixel electrode overlapping with the aperture and electrically connected to the switching element, and a first alignment film overlapping with the organic insulating film and being in contact with the liquid crystal layer. The second substrate includes a second transparent substrate, and a second alignment film overlapping the second transparent substrate and being in contact with the liquid crystal layer. The organic insulating film includes an upper surface facing the second substrate and a protruding portion protruding from the upper surface onto the second substrate to support the second substrate.

According to such a configuration, a display device capable of improving the display quality can be provided.

Embodiments will be described hereinafter with reference to the accompanying drawings. The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In addition, in the specification and drawings, the same elements as those described in connection with preceding drawings are denoted by like reference numbers, and detailed description thereof is omitted unless necessary.

In the embodiments, a highly translucent liquid crystal display device to which polymer dispersed liquid crystal is applied (so-called transparent display device) is disclosed as an example of the display device. However, the configurations disclosed in the embodiments can also be applied to the other types of display devices.

First Embodiment

FIG. 1 is a schematic plan view showing an example of a display device DSP according to the present embodiment. In the drawings including FIG. 1, an X-axis, a Y-axis and a Z-axis orthogonal to each other are described to facilitate understanding as needed. A direction along the X-axis is referred to as a first direction X, a direction along the Y-axis is referred to as a second direction Y, and a direction along the Z-axis is referred to as a third direction Z.

The first direction X, the second direction Y, and the third direction Z are orthogonal to each other, but may cross each other at an angle other than 90 degrees. The first direction X and the second direction Y correspond to the directions parallel to the main surface of the substrate which constitutes the display device DSP, and the third direction Z corresponds to the thickness direction of the display device DSP. In the present embodiment, viewing an X-Y plane defined by the first direction X and the second direction Y is referred to as plan view. The third direction Z may be referred to as an upward direction, and a direction opposite to the third direction Z may be referred to as a downward direction.

The display device DSP comprises a display panel PNL, a plurality of wiring boards 1, a plurality of IC chips 2, and a light emitting module 100.

The display panel PNL has a rectangular shape elongated in the first direction X in the example shown in FIG. 1. Incidentally, the display panel PNL may be formed in a rectangular shape elongated in the second direction Y, a square shape, the other polygonal shape, or the other shape such as a circular shape or an elliptical shape.

The display panel PNL comprises a first substrate SUB1, a second substrate SUB2 that overlaps with the first substrate SUB1, a liquid crystal layer LC that contains polymer dispersed liquid crystal, and a seal SE. The first substrate SUB1 and the second substrate SUB2 are formed in a flat plate shape parallel to the X-Y plane.

The first substrate SUB1 and the second substrate SUB2 overlap with each other in the third direction Z. An area where the first substrate SUB1 and the second substrate SUB2 overlap includes a display area DA where images are displayed.

The first substrate SUB1 comprises the first transparent substrate 10. The first transparent substrate 10 has side surfaces 101 and 102 along the first direction X and side surfaces 103 and 104 along the second direction Y. The side surfaces 101 and 102 are arranged in this order in the second direction Y. The side surfaces 103 and 104 are arranged in this order in the first direction X.

The second substrate SUB2 comprises the second transparent substrate 20. The second transparent substrate 20 has side surfaces 201 and 202 along the first direction X and side surfaces 203 and 204 along the second direction Y. The side surfaces 201 and 202 are arranged in this order in the second direction Y. The side surfaces 203 and 204 are arranged in this order in the first direction X.

The side surfaces 101 and 102 and the side surfaces 201 and 202 are side surfaces along the long sides of the display panel PNL, and the side surfaces 103 and 104 and the side surfaces 203 and 204 are side surfaces along the short sides of the display panel PNL.

In the example shown in FIG. 1, the side surface 102 overlaps with the side surface 202, the side surface 103 overlaps with the side surface 203, and the side surface 104 overlaps with the side surface 204, but these side surfaces do not need to overlap.

A width of the first substrate SUB1 in the second direction Y is larger than a width of the second substrate SUB2 in the second direction Y. In other words, the side surface 201 does not overlap with the side surface 101. The side surface 201 is located between the side surface 101 and the display area DA in the second direction Y.

The first substrate SUB1 includes an extending portion Ex located between the side surface 101 and the side surface 201. The extending portion Ex corresponds to a portion of the first substrate SUB1, which extends in a direction opposite to the second direction Y from a portion overlapping with the second substrate SUB2.

The plurality of wiring boards 1 and the plurality of IC chips 2 are mounted on the extending portion Ex. The plurality of wiring boards 1 are, for example, flexible printed circuits which can be bent. The plurality of IC chips 2 incorporate, for example, display drivers which outputs signals necessary for image display, and the like. Incidentally, the IC chips 2 may be mounted on the wiring boards 1.

The plurality of wiring boards 1 are aligned at intervals in the first direction X with respect to the display panel PNL in the example shown in FIG. 1. Incidentally, the plurality of wiring boards 1 may be a single wiring board extending in the first direction X.

The plurality of IC chips 2 are aligned at intervals in the first direction X with respect to the display panel PNL in the example shown in FIG. 1. Incidentally, the plurality of IC chips 2 may be a single IC chip extending in the first direction X.

Details of the light emitting module 100 will be described later. The light emitting module 100 is arranged along the side surface 201 of the second transparent substrate 20. The light emitting module 100 overlaps with the extending portion Ex in plan view.

The seal SE adheres the first substrate SUB1 and the second substrate SUB2. The seal SE is formed in a frame shape. The seal SE surrounds the liquid crystal layer LC between the first substrate SUB1 and the second substrate SUB2.

The liquid crystal layer LC is held between the first substrate SUB1 and the second substrate SUB2. Such a liquid crystal layer LC is arranged over an area (including the display area DA) surrounded by the seal SE in plan view.

As shown and enlarged in FIG. 1, the liquid crystal layer LC is composed of polymer dispersed liquid crystals containing polymers 31 and liquid crystal molecules 32. For example, the polymers 31 are liquid crystal polymers. The polymers 31 are formed in a streaky shape extending along the first direction X and are arranged in the second direction Y.

The liquid crystal molecules 32 are dispersed in gaps of the polymers 31 and are aligned such that their long axes extend along the first direction X. Each of the polymers 31 and the liquid crystal molecules 32 has optical anisotropy or refractive anisotropy. The responsiveness of the polymers 31 for an electric field is lower than that of the liquid crystal molecules 32 for an electric field.

In one example, the alignment direction of the polymers 31 does not substantially change regardless of the presence or absence of the electric field. In contrast, the alignment direction of the liquid crystal molecules 32 changes in accordance with the electric field in a state in which a voltage higher than or equal to a threshold value is applied to the liquid crystal layer LC.

In a state in which the voltage is not applied to the liquid crystal layer LC (initial alignment state), optical axes of the polymers 31 and the liquid crystal molecules 32 are parallel to one another, and the light made incident on the liquid crystal layer LC is hardly scattered but is transmitted through the liquid crystal layer LC (transparent state).

In a state in which a voltage is applied to the liquid crystal layer LC, the alignment direction of the liquid crystal molecules 32 changes, and the optical axes of the polymers 31 and the liquid crystal molecules 32 intersect one another. Therefore, the light made incident on the liquid crystal layer LC is scattered in the liquid crystal layer LC (scattered state). In other words, the liquid crystal layer LC can switch the transparent state and the scattered state in accordance with the applied voltage.

Figure 2:
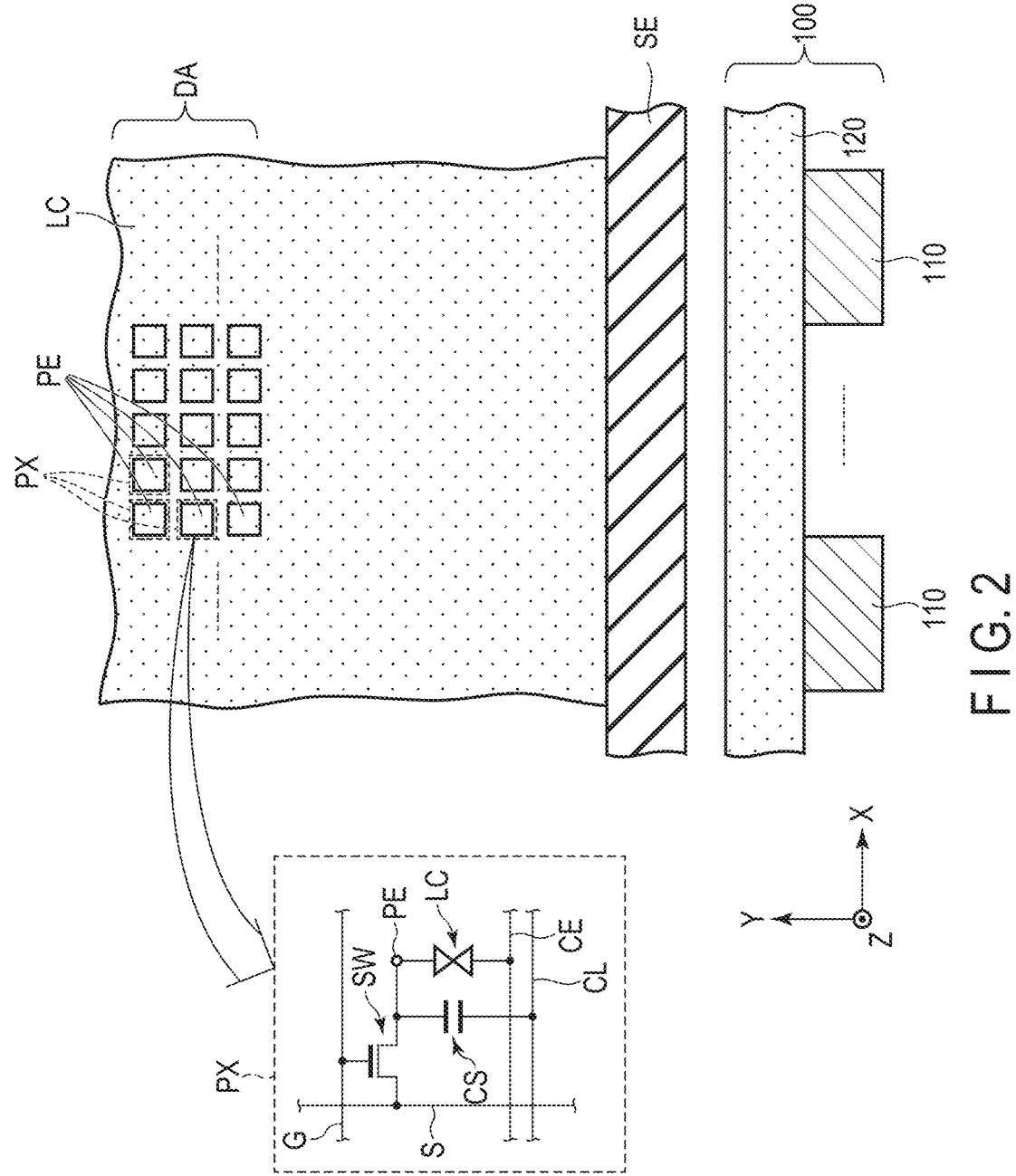
FIG. 2 is a schematic plan view showing an area in the vicinity of a light emitting module.

FIG. 2 is a schematic plan view showing an area in the vicinity of the light emitting module 100. The light emitting module 100 comprises a plurality of light emitting elements 110 and a light guide 120. The plurality of light emitting elements 110 are arranged in the first direction X. The light guide 120 is formed in a rod shape extending in the first direction X. The light guide 120 is located between the seal SE and the light emitting elements 110.

The display area DA includes a plurality of pixels PX arrayed in a matrix in the first direction X and the second direction Y. These pixels PX are represented by dotted lines in the drawing. Each of the pixels PX comprises a pixel electrode PE represented as a square of a solid line in the drawing.

As shown and enlarged in FIG. 2, each pixel PX comprises a switching element SW, a pixel electrode PE, a common electrode CE, and a capacitance CS. The switching element SW is composed of, for example, a thin-film transistor (TFT) and is electrically connected to a scanning line G and a signal line S.

The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW.

The common electrode CE and a power supply line CL are arranged over the display area DA and its surrounding area. A common voltage Vcom is applied to the common electrode CE. For example, a voltage having the same potential as the common electrode CE is applied to the power supply line CL.

Each of the pixel electrodes PE is opposed to the common electrode CE in the third direction Z. In the display area DA, the liquid crystal layer LC (particularly, liquid crystal molecules 32) is driven by an electric field generated between the pixel electrode PE and the common electrode CE. For example, the capacitance CS is formed between the power supply line CL and the pixel electrode PE.

Figure 3:
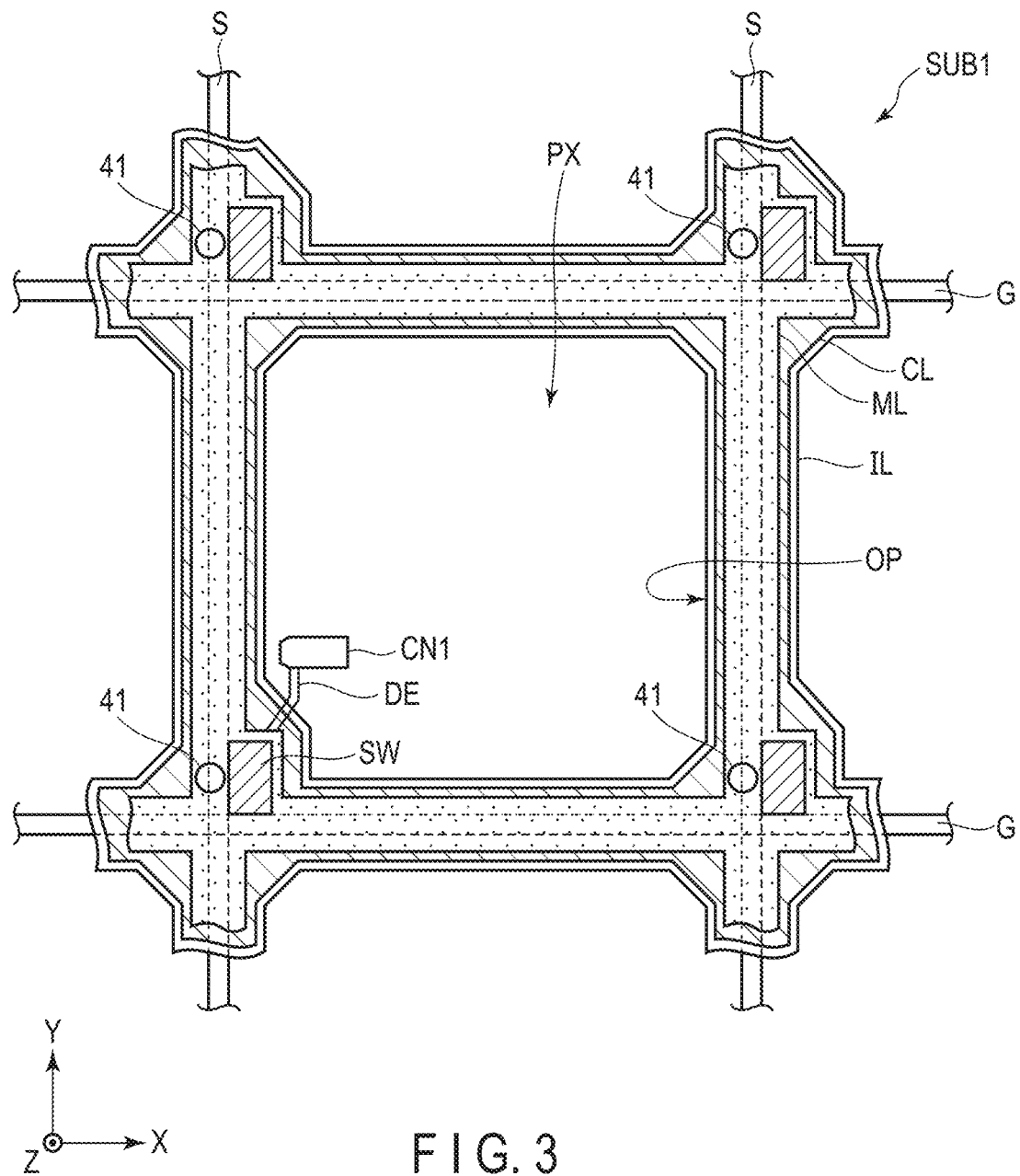
FIG. 3 is a schematic plan view showing an example of a pixel.

FIG. 3 is a schematic plan view showing an example of the pixel PX. FIG. 3 shows a part of the configuration included in the first substrate SUB1. The first substrate SUB1 comprises a plurality of scanning lines G, a plurality of signal lines S, switching elements SW, an insulating film IL, the power supply line CL, metal lines ML, and connection electrodes CN1.

Each of the plurality of scanning lines G extends in the first direction X. Each of the plurality of signal lines S extends in the second direction Y and intersects the plurality of scanning lines G. In the present specification, the pixel PX corresponds to an area defined by two scanning lines G that are adjacent in the second direction Y and two signal lines S that are adjacent in the first direction X. The switching element SW is arranged near a part where the scanning line G and the signal line S intersect.

The insulating film IL is formed in a grating pattern in each pixel PX. The insulating film IL overlaps with each of the scanning lines G, the signal lines S, and the switching element SW. The insulating film IL includes an aperture OP. In other words, the insulating film IL is formed in a bathtub shape.

The switching element SW comprises a drain electrode DE that extends into the aperture OP. The connection electrode CN1 is formed in an island shape and is located in the aperture OP. The connection electrode CN1 is electrically connected to one end of the drain electrode DE.

The power supply line CL is arranged on the insulating film IL and is formed in a grating pattern surrounding the pixel PX. The planar shape of the power supply line CL is substantially the same as the planar shape of the insulating film IL. The power supply line CL is separated from the connection electrode CN1.

The metal line ML is arranged on the power supply line CL and is formed in a grating pattern surrounding the pixel PX. For example, the metal line ML is formed to have a width smaller than that of the power supply line CL, and does not protrude from the power supply line CL in plan view. These power supply line CL and metal line ML overlap with each of the scanning line G, the signal line S, and the switching element SW.

The insulating film IL further has a protruding portion 41 as shown in FIG. 3. The protruding portion 41 is located near the switching element SW in the example shown in FIG. 3. In other words, the protruding portion 41 is located near the part where the scanning line G and the signal line S intersect.

In this case, "near" implies a case where the protruding portion 41 entirely overlaps with the switching element SW, a case where the protruding portion 41 partially overlaps with the switching element SW, and a case where the protruding portion 41 does not overlap with the switching element SW.

The protruding portion 41 has, for example, a circular shape in plan view. Incidentally, the protruding portion 41 may be formed in a square shape, the other polygonal shape, or the other shape such as an elliptical shape in plan view.

Figure 4:
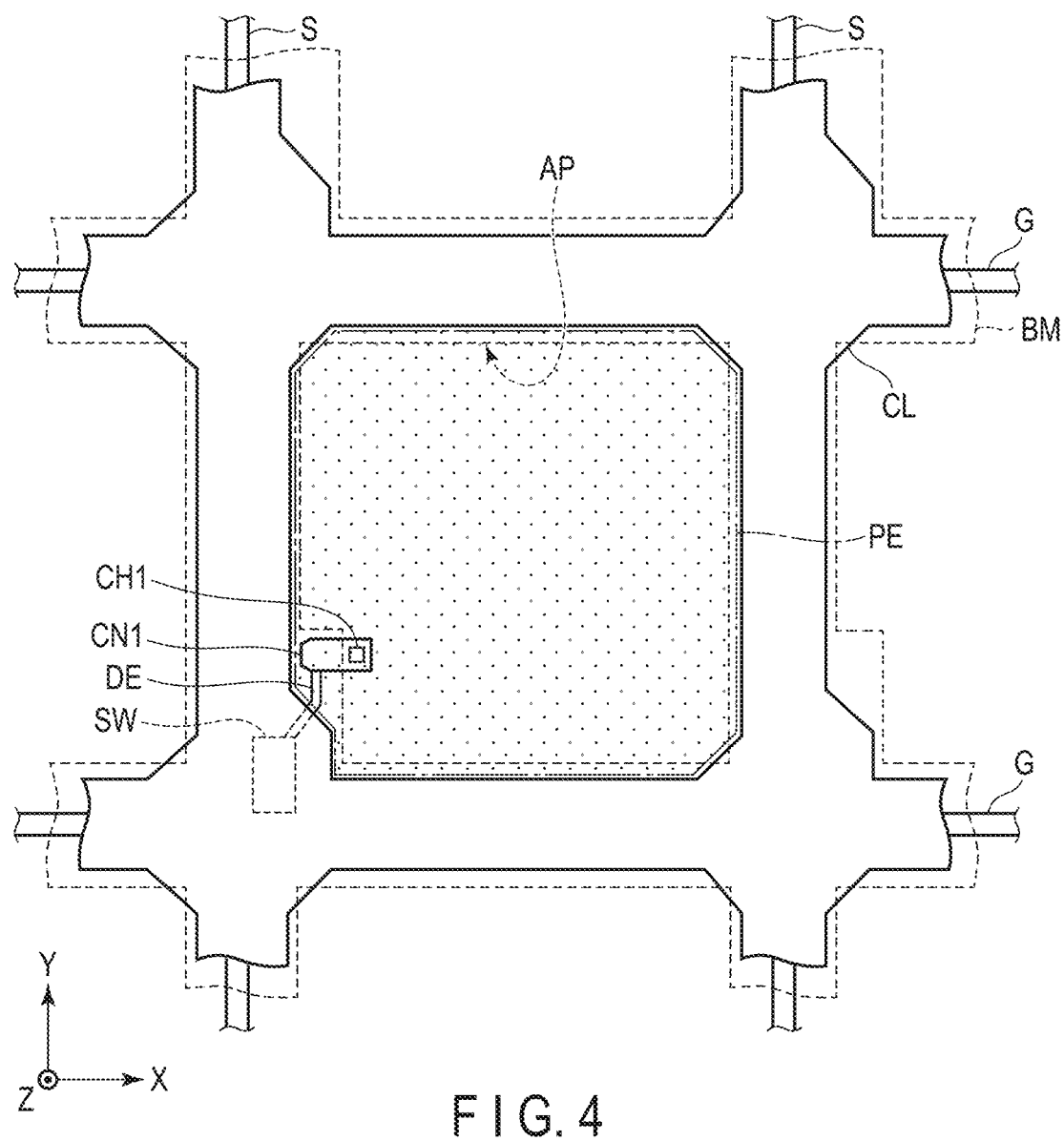
FIG. 4 is a schematic plan view showing an example of a pixel electrode arranged in the pixel shown in FIG. 3.

FIG. 4 is a schematic plan view showing an example of the pixel electrode PE arranged in the pixel PX shown in FIG. 3. The pixel electrode PE represented by a one-dot chain line overlaps with the aperture OP of the insulating film IL (shown in FIG. 3).

The pixel electrode PE overlaps with the connection electrode CN1 at the aperture OP. An insulating film is interposed between the pixel electrode PE and the connection electrode CN1. A contact hole CH1 is formed in the insulating film. The pixel electrode PE is in contact with the connection electrode CN1 in the contact hole CH1. The pixel electrode PE is thereby electrically connected to the switching element SW.

In FIG. 4, a light-shielding layer BM provided on the second substrate SUB2 is further represented by a dotted line. The light-shielding layer BM is formed in a grating pattern. The light-shielding layer BM overlaps with the power supply line CL, the switching element SW, several parts of the connection electrode CN1, and the like in plan view. The light-shielding layer BM also overlaps with the scanning lines G and signal lines S, and the metal lines ML shown in FIG. 3.

The light-shielding layer BM is formed to be larger than the scanning line G, the signal line S and the switching element SW in plan view. In other words, the scanning line G, the signal line S, and the switching element SW do not have portions that extend beyond the light-shielding layer BM in plan view. The light-shielding layer BM includes an aperture AP which overlaps with the pixel electrode PE in plan view.

Figure 5:
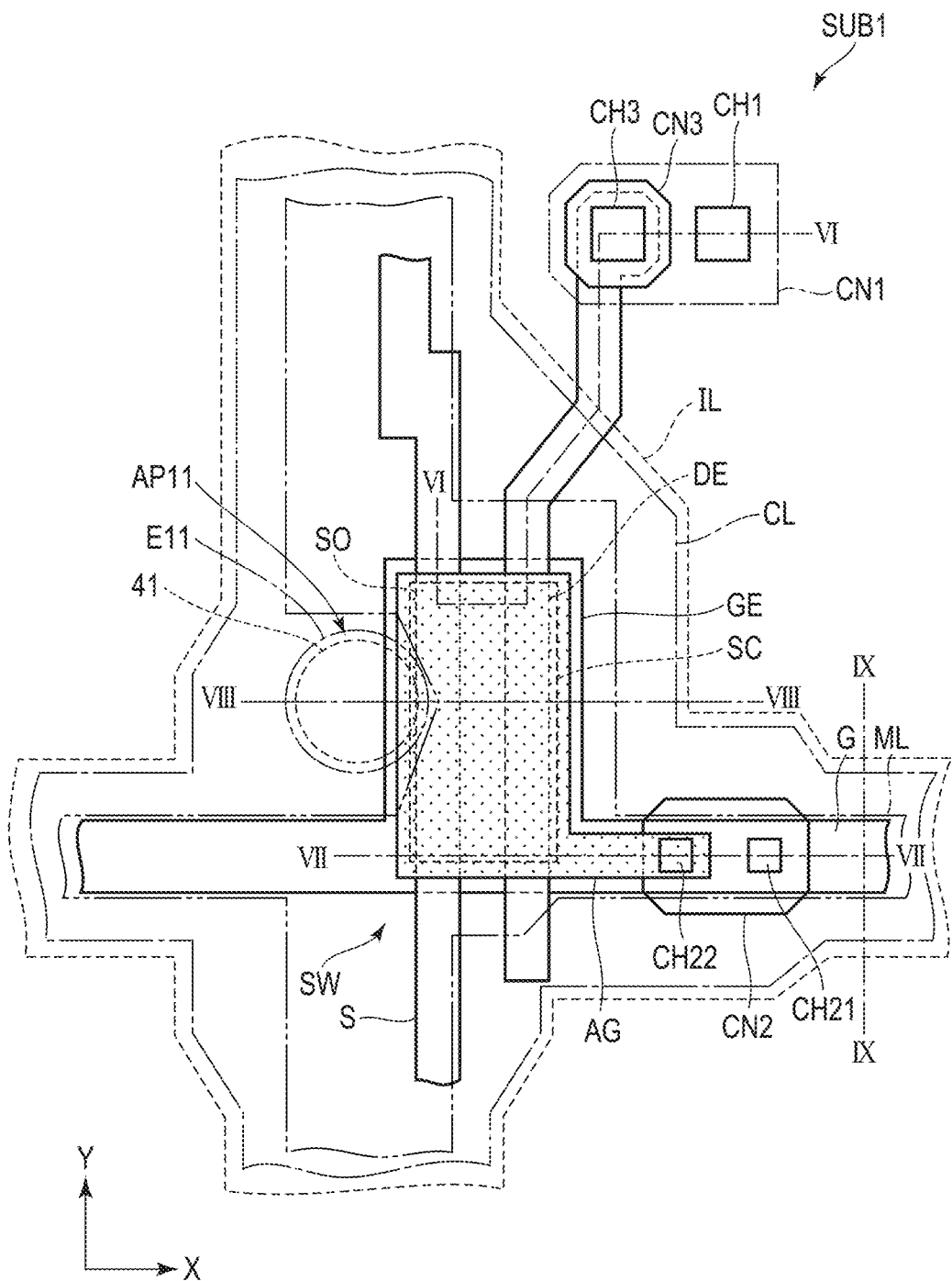
FIG. 5 is a schematic plan view showing an example of a first substrate including a switching element shown in FIG. 4.

FIG. 5 is a schematic plan view showing an example of a first substrate SUB1 including the switching element SW shown in FIG. 4. The switching element SW comprises a semiconductor SC, a gate electrode GE integrated with the scanning line G, a source electrode SO integrated with the signal line S, a drain electrode DE, and an auxiliary gate electrode AG.

The semiconductor SC is an oxide semiconductor. Incidentally, the semiconductor SC may be a silicon-based semiconductor of polycrystalline silicon, amorphous silicon or the like. In the example shown in FIG. 5, the auxiliary gate electrode AG overlaps with the gate electrode GE and the semiconductors SC.

The semiconductor SC is located between the gate electrode GE and the auxiliary gate electrode AG. The auxiliary gate electrode AG further overlaps with the scanning line G.

A connection electrode CN2 is interposed between the scanning line G and the auxiliary gate electrode AG.

An insulating film is interposed between the scanning line G and the connection electrode CN2. A contact hole CH21 is formed in the insulating film. The connection electrode CN2 is in contact with the scanning line G in the contact hole CH21.

An insulating film is interposed between the connection electrode CN2 and the auxiliary gate electrode AG. A contact hole CH22 is formed in the insulating film. The auxiliary gate electrode AG is in contact with the connection electrode CN2 in the contact hole CH22.

The auxiliary gate electrode AG is thereby electrically connected to the scanning line G, similarly to the gate electrode GE. In other words, the gate electrode GE and the auxiliary gate electrode AG have the same potential as the scanning line G.

Each of the source electrode SO and the drain electrode DE extends along the second direction Y, and the electrodes are arranged at intervals along the first direction X. The source electrode SO is in contact with one end side of the semiconductor SC. The drain electrode DE is in contact with the other end side of the semiconductor SC.

One end portion of the drain electrode DE overlaps with a connection electrode CN3. An insulating film is interposed between the drain electrode DE and the connection electrode CN3. A contact hole CH3 is formed in the insulating film. The drain electrode DE is in contact with the connection electrode CN3 in the contact hole CH3.

The connecting electrode CN1 represented by a one-dot chain line is in contact with the connection electrode CN3. The connection electrode CN1 is thereby electrically connected to the switching element SW. The connection electrode CN1 is electrically connected to the pixel electrode PE shown in FIG. 4 in the contact hole CH1.

The power supply line CL represented by a one-dot chain line overlaps with the gate electrode GE and the auxiliary gate electrode AG of the switching element SW. The power supply line CL includes a first aperture AP11. An edge E11 defining the first aperture AP11 has, for example, a circular shape. Incidentally, the edge E11 is not limited to the example shown in the drawing, but may be formed in a shape such as a quadrangular shape, the other polygonal shape, or an elliptical shape. The insulating film arranged on the power supply line CL includes an aperture (through hole) (not shown).

The metal line ML represented by a two-dot chain line overlaps with the power supply line CL and also overlaps with a part of the switching element SW. The insulating film IL has the protruding portion 41 as described with reference to FIG. 3. In relation to the protruding portion 41, the power supply line CL, the metal line ML, and the insulating film do not overlap with the protruding portion 41.

Figure 6:
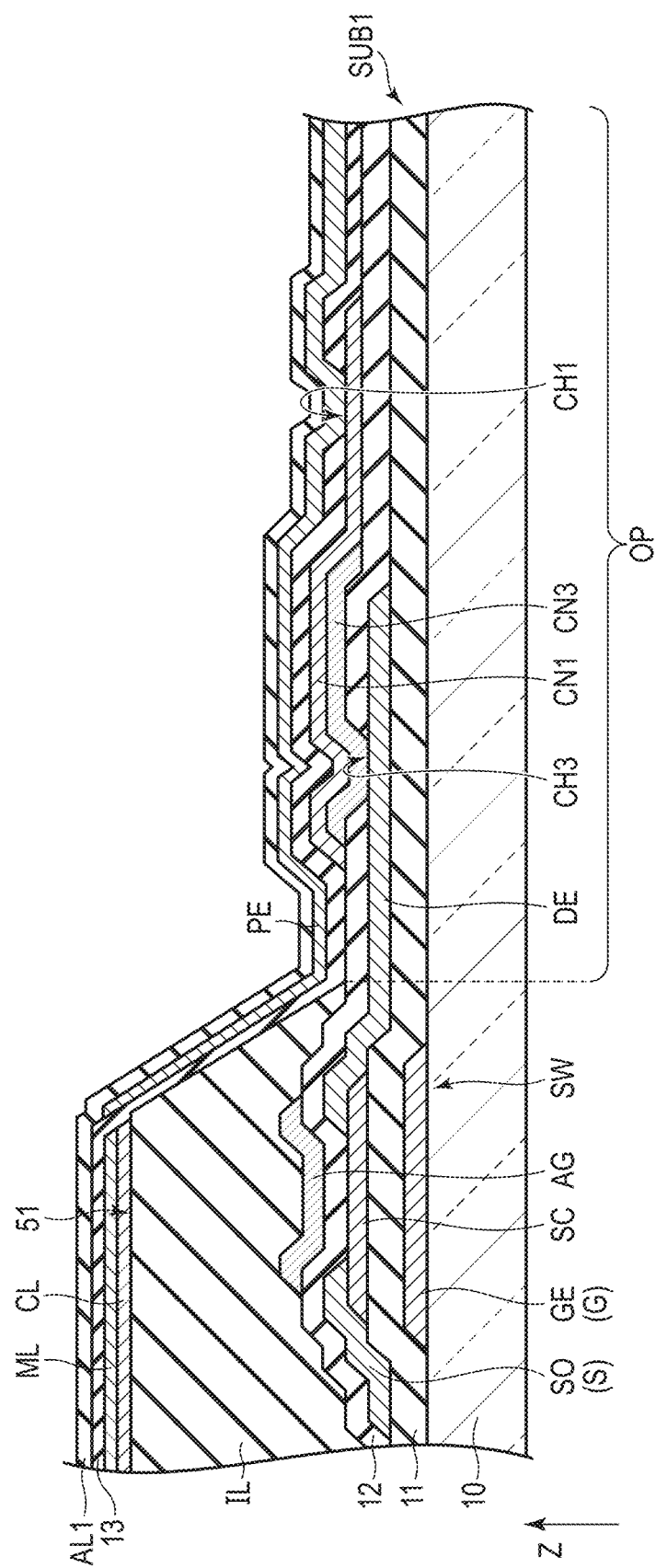
FIG. 6 is a schematic cross-sectional view showing an example of the first substrate along line VI-VI shown in FIG. 5.

FIG. 6 is a schematic cross-sectional view showing an example of the first substrate SUB1 along line VI-VI shown in FIG. 5. The first substrate SUB1 comprises the first transparent substrate 10, insulating films 11, 12, and 13, the insulating film IL, the switching element SW, the power supply line CL, the metal line ML, the pixel electrode PE, and the alignment film AL1 (first alignment film).

The gate electrode GE integrated with the scanning line G is arranged on the first transparent substrate 10. The insulating film 11 covers the first transparent substrate 10 and the gate electrode GE. The semiconductor SC is arranged on the insulating film 11 and is located directly above the gate electrode GE.

The source electrode SO integrated with the signal line S is arranged on the insulating film 11 and is in contact with the semiconductor SC. The drain electrode DE is arranged on the insulating film 11 and is in contact with the semiconductor SC.

For example, the source electrode SO and the drain electrode DE are formed of the same metal material. The insulating film 12 covers the insulating film 11, the source electrode SO, and the drain electrode DE. The insulating film 12 is in contact with the semiconductor SC at a position between the source electrode SO and the drain electrode DE.

The auxiliary gate electrode AG is arranged on the insulating film 12 and is located directly above the gate electrode GE and the semiconductor SC. The connection electrode CN3 is arranged on the insulating film 12. The connection electrode CN3 is in contact with the drain electrode DE through the contact hole CH3 formed in the insulating film 12.

For example, the auxiliary gate electrode AG and the connection electrode CN3 are formed of the same metal material. The insulating film IL covers the auxiliary gate electrode AG. The connection electrode CN3 is located in the aperture OP and is exposed from the insulating film IL.

The power supply line CL is arranged on the insulating film IL. The connection electrode CN1 is spaced apart from the power supply line CL. The connection electrode CN1 is arranged on the insulating film 12 at the aperture OP of the insulating film IL.

The power supply line CL and the connection electrode CN1 are located in substantially the same layer and are collectively formed of the same material. The connection electrode CN1 is arranged on the connection electrode CN3.

The metal line ML is arranged on the power supply line CL. The insulating film 13 covers the power supply line CL, the metal line ML, and the connection electrode CN1. The insulating film 13 comprises a function of a protective film protecting the power supply line CL, the metal line ML, and the connection electrode CN1.

The pixel electrode PE is arranged on the insulating film 13. The pixel electrode PE overlaps with the aperture AP. The pixel electrode PE is in contact with the connection electrode CN1 through the contact hole CH1 formed in the insulating film 13.

The alignment film AL1 covers the pixel electrode PE and the insulating film 13. Part of the insulating film 13 is located between the insulating film IL and the alignment film AL1. From another viewpoint, the alignment film AL1 overlaps with the insulating film IL.

The insulating films 11, 12, and 13 are, for example, transparent inorganic insulating films of silicon oxide, silicon nitride, silicon oxynitride or the like. The insulating film IL is, for example, a transparent organic insulating film of an acrylic resin or the like. The power supply line CL, the connection electrode CN1, and the pixel electrode PE are transparent electrodes formed of a transparent conductive material such as indium tin oxide (ITO) or indium zinc oxide (IZO).

Figure 7:
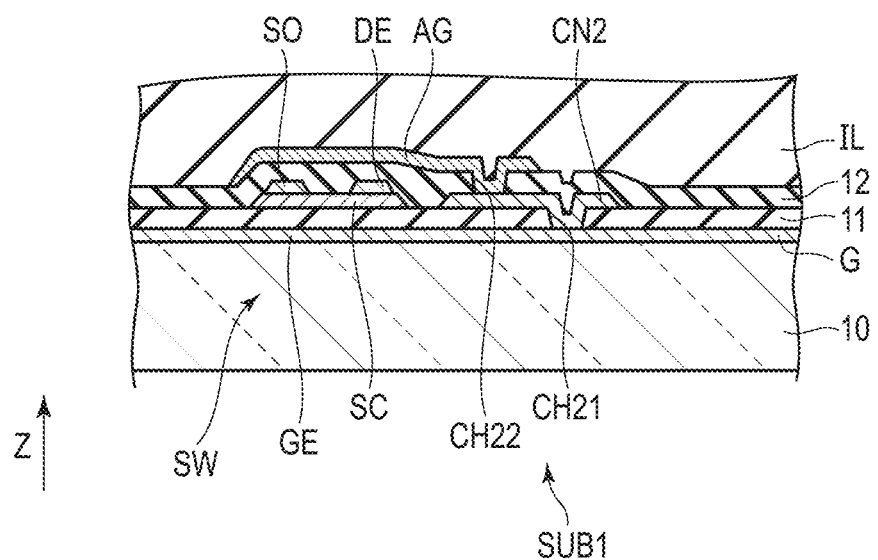
FIG. 7 is a schematic cross-sectional view showing an example of the first substrate along line VII-VII shown in FIG. 5.

FIG. 7 is a schematic cross-sectional view showing an example of the first substrate SUB1 along line VII-VII shown in FIG. 5. The connection electrode CN2 is arranged on the insulating film 11. The connection electrode CN2 is in contact with the scanning line G through the contact hole CH21 formed in the insulating film 11.

The connection electrode CN2 is formed of, for example, the same metal material as the source electrode SO and the drain electrode DE. The insulating film 12 covers the insulating film 11, the connection electrode CN2, the source electrode SO, and the drain electrode DE. The auxiliary gate electrode AG is in contact with the connection electrode CN2 through the contact hole CH22 formed in the insulating film 12.

Figure 8:
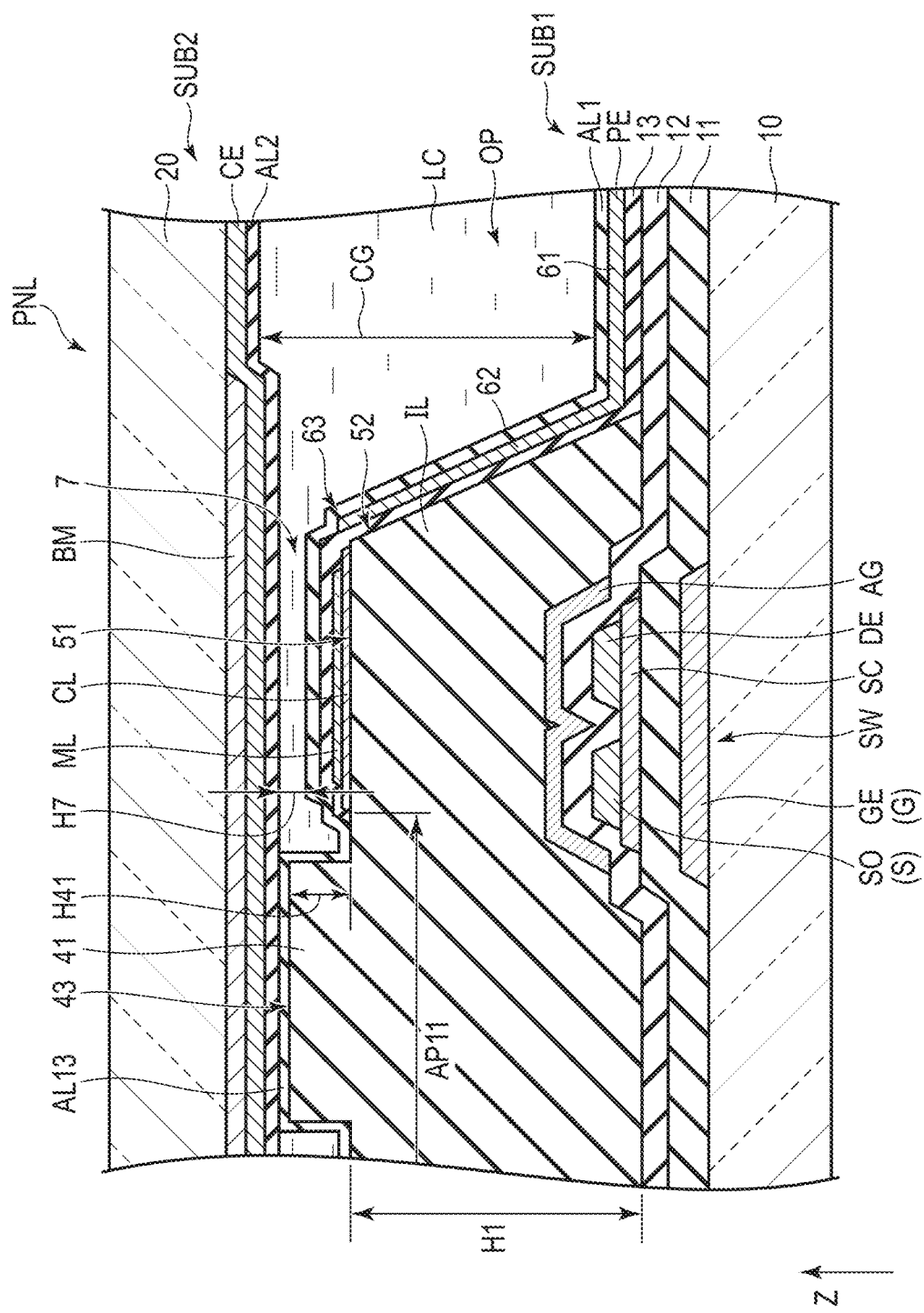
FIG. 8 is a schematic cross-sectional view showing an example of a display panel along line VII-VIII shown in FIG. 5.
Figure 9:
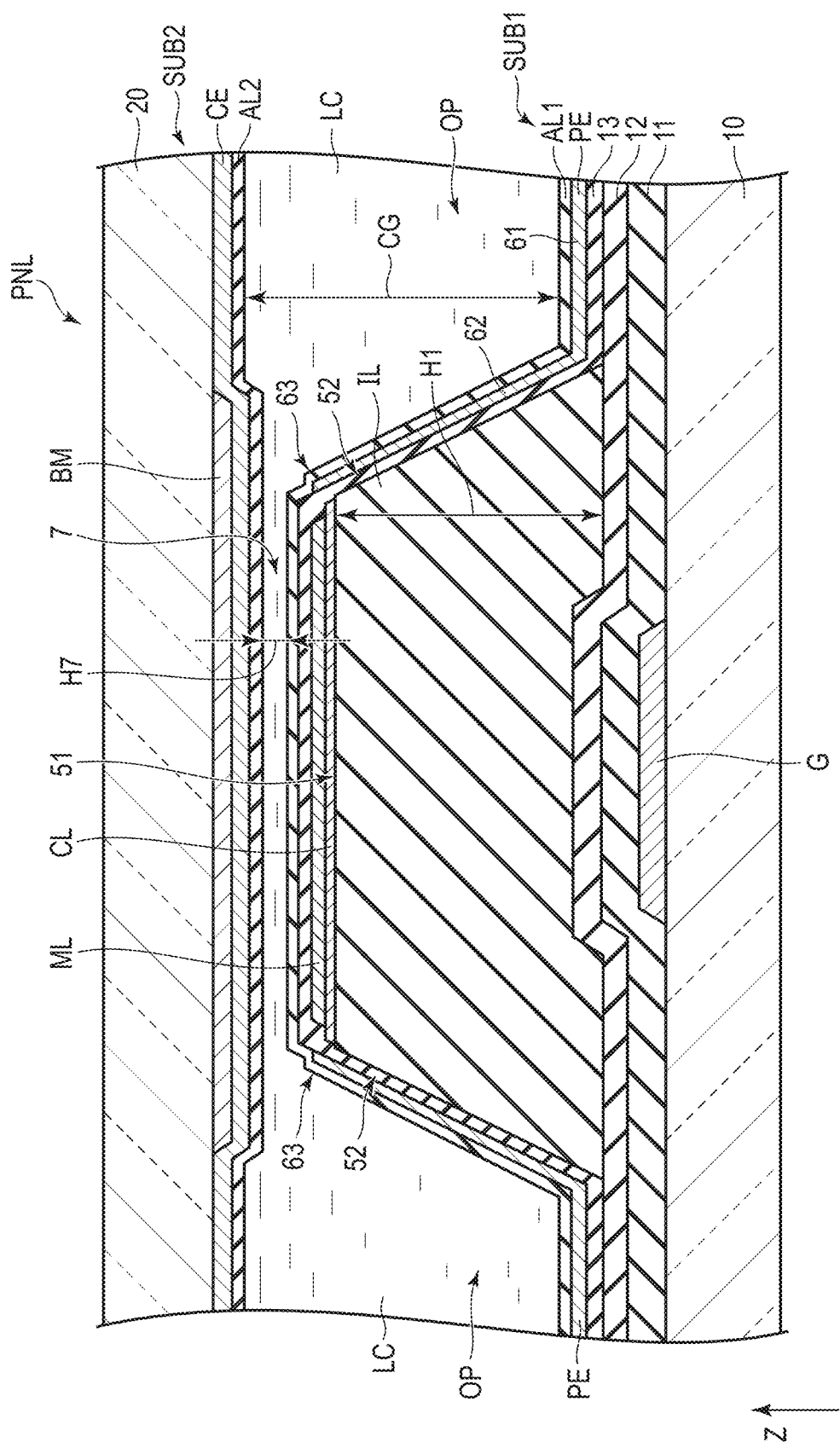
FIG. 9 is a schematic cross-sectional view showing an example of the display panel along line IX-IX shown in FIG. 5.

FIG. 8 is a schematic cross-sectional view showing an example of the display panel PNL along line VII-VIII shown in FIG. 5. FIG. 9 is a schematic cross-sectional view showing an example of the display panel PNL along line IX-IX shown in FIG. 5.

The switching element SW is covered with an insulating film IL, which is an organic insulating film, as shown in FIG. 8. The insulating film IL overlaps with the scanning line G as shown in FIG. 9. FIG. 9 shows the cross-section along the second direction Y including the scanning line G, but the cross-section along the first direction X including the signal line S is configured in the same manner.

The second substrate SUB2 comprises the second transparent substrate 20, the light-shielding layer BM, the common electrode CE, and an alignment film AL2 (second alignment film) as shown in FIG. 8 and FIG. 9. The light-shielding layer BM is formed of, for example, a metal material. The common electrode CE is a transparent electrode formed of a transparent conductive material such as indium tin oxide (ITO) or indium zinc oxide (IZO).

The light-shielding layer BM is located between the second transparent substrate 20 and the alignment film AL2. In relation to the first substrate SUB1, the light-shielding layer BM faces the switching element SW, and the like. The light-shielding layer BM is located directly above the scanning line G and the signal line S, and directly above the switching element SW.

The common electrode CE is arranged across the plurality of pixels PX and covers the light-shielding layer BM. The common electrode CE faces the pixel electrode PE across the liquid crystal layer LC in the aperture OP.

Several parts of the common electrode CE are located between the light-shielding layer BM and the alignment film AL2. Since the common electrode CE is in contact with the light-shielding layer BM, the common electrode CE is electrically connected to the light-shielding layer BM. The common electrode CE is thereby made low-resistant.

The alignment film AL2 covers the common electrode CE. In relation to the second transparent substrate 20, the alignment film AL2 overlaps with the second transparent substrate 20. The liquid crystal layer LC is located between the first substrate SUB1 and the second substrate SUB2.

Each of the alignment films AL1 and AL2 is in contact with the liquid crystal layer LC as shown in FIG. 8 and FIG. 9. A transparent insulating film may be interposed between the light-shielding layer BM and the common electrode CE or between the common electrode CE and the alignment film AL2.

The insulating film IL has a bathtub shape as described above. As shown in FIG. 8 and FIG. 9, the insulating film IL has an upper surface 51 that faces the second substrate SUB2, and a plurality of side surfaces 52 connected to the upper surface 51.

The plurality of side surfaces 52 define the apertures OP. For example, the side surface 52 shown in FIG. 8 extends along the second direction Y, and the plurality of side surfaces 52 shown in FIG. 9 extend along the first direction X.

Several parts of the insulating film 13 overlap with the upper surface 51 and the side surfaces 52. More specifically, several parts of the insulating film 13 face the upper surface 51 across the power supply line CL and the metal line ML and are in contact with the side surfaces 52.

The power supply line CL is located between the upper surface 51 and the insulating film 13. More specifically, the power supply line CL which is a transparent electrode is in contact with the upper surface 51 of the insulating film IL. The metal line ML is located between the power supply line CL and the insulating film 13 and is in contact with the power supply line CL and the insulating film 13. The metal line ML is electrically connected with the power supply line CL by being brought into contact with the power supply line CL. Although not shown in the drawings, several parts of the power supply line CL are formed on the side surfaces 52, a pixel electrode PE (side portion 62 to be described below) and the power supply line CL overlap on the side surfaces 52, and the capacitance CS shown in FIG. 2 is thereby formed.

The insulating film IL further includes a protruding portion 41 as shown in FIG. 8. The protruding portion 41 protrudes from the upper surface 51 toward the second substrate SUB2. The protruding portion 41 supports the second substrate SUB2. The protruding portion 41 has, for example, an approximately cylindrical shape.

The protruding portion 41 passes through the first aperture AP11 of the power supply line CL. In other words, the first aperture AP11 penetrates toward the upper surface 51. The protruding portion 41 has an end surface 43 facing the second substrate SUB2. The protruding portion 41 overlaps with the light-shielding layer BM.

The size (diameter) of the protruding portion 41 is in a range from 10 μm to 20 μm in one example, but is not limited to this example. A height H41 of the protruding portion 41 is, for example, 1.0 μm or less. The height H41 of the protruding portion 41 is desirably 0.6 μm or less. The height H41 of the protruding portion 41 corresponds to a distance from the upper surface 51 to the end surface 43 of the protruding portion 41 along the third direction Z.

The protruding portion 41 and the upper surface 51 of the insulating film IL are formed by, for example, half-exposure with a halftone mask to the organic insulating material. In this case, the protruding portion 41 is formed integrally with the upper surface 51.

The alignment film AL1 covers the protruding portion 41. In relation to the protruding portion 41, the alignment film AL1 includes a contact portion AL13 located between the protruding portion 41 and the second substrate SUB2.

More specifically, the contact portion AL13 is located between the protruding portion 41 and the alignment film AL2 in the example shown in FIG. 8. More specifically, the contact portion AL13 is in contact with the end surface 43 of the protruding portion 41 and the alignment film AL2.

In the display panel PNL, a predetermined cell gap CG is formed between the first substrate SUB1 and the second substrate SUB2 mainly by the protruding portion 41. The cell gap CG corresponds to a distance along the third direction Z from the alignment film AL1 to the alignment film AL2 in the aperture OP. For example, the cell gap CG is in a range from approximately 1 μm to 4 μm.

The insulating film IL has a predetermined height H1. The height H1 corresponds to, for example, a distance along the third direction Z from the insulating film 13 to the upper surface 51. In the insulating film IL, the heights H1 and H41 are set according to the desired cell gap CG. In one example, the height H1 is in a range from approximately 0.4 μm to 4 μm.

A gap 7 is formed between the upper surface 51 and the second substrate SUB2, as shown in FIG. 8 and FIG. 9. For example, a height H7 of the gap 7 is desirably smaller than approximately 1.0 μm. The height H7 of the gap 7 is more desirably 0.6 µm or less. The height H7 of the gap 7 corresponds to the distance along the third direction Z from the alignment film AL1 to the alignment film AL2, at the position overlapping with the power supply line CL and the metal line ML, in the area overlapping with the upper surface 51.

The pixel electrode PE is provided in the aperture OP and a part of the electrode is provided along the side surface 52. More specifically, the pixel electrode PE includes a main portion 61 and a side portion 62. The side portion 62 is formed integrally with the main portion 61. The main portion 61 is located in the aperture OP. The side portion 62 faces the side surface 52 across the insulating film 13.

The side portion 62 has a distal portion 63. The distal portion 63 is spaced apart from the alignment film AL2, as shown in FIG. 8 and FIG. 9. In other words, the distal portion 63 is not in contact with the alignment film AL2.

The distal portion 63 does not overlap with the power supply line CL in the third direction Z. For example, the distal portion 63 is located near the upper end of the side surface 52, but may be located near a lower end of the side surface 52 or located near a central part of the side surface 52.

According to the display device DSP configured as described above, the display quality can be improved. More specifically, in the display device DSP, the insulating film IL has an upper surface 51 facing the second substrate SUB2, and a protruding portion 41 protruding from the upper surface 51 onto the second substrate SUB2 and supporting the second substrate SUB2.

Figure 10:
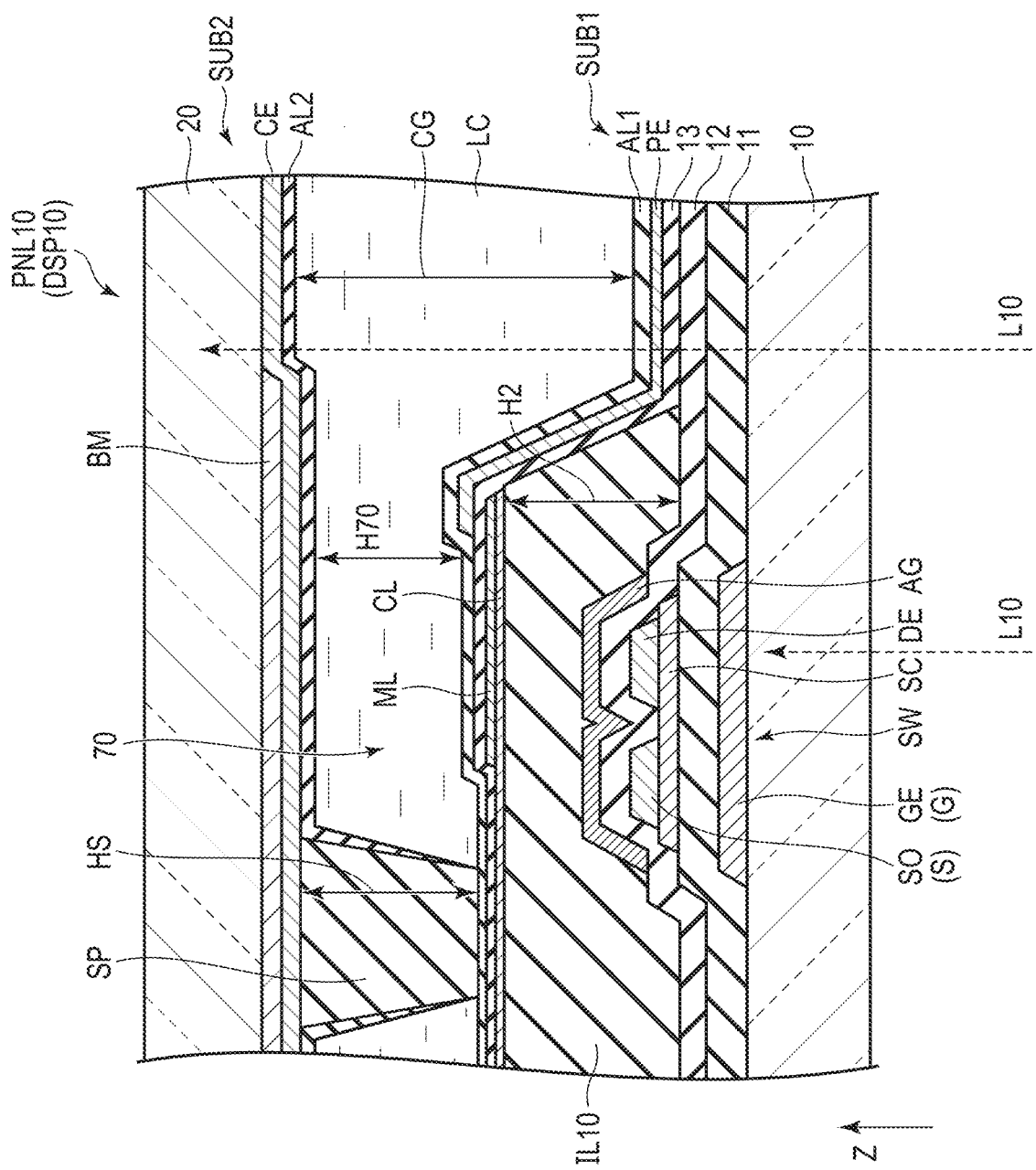
FIG. 10 is a schematic cross-sectional view showing an example of a display panel provided in a display device according to a comparative example.
Figure 11:
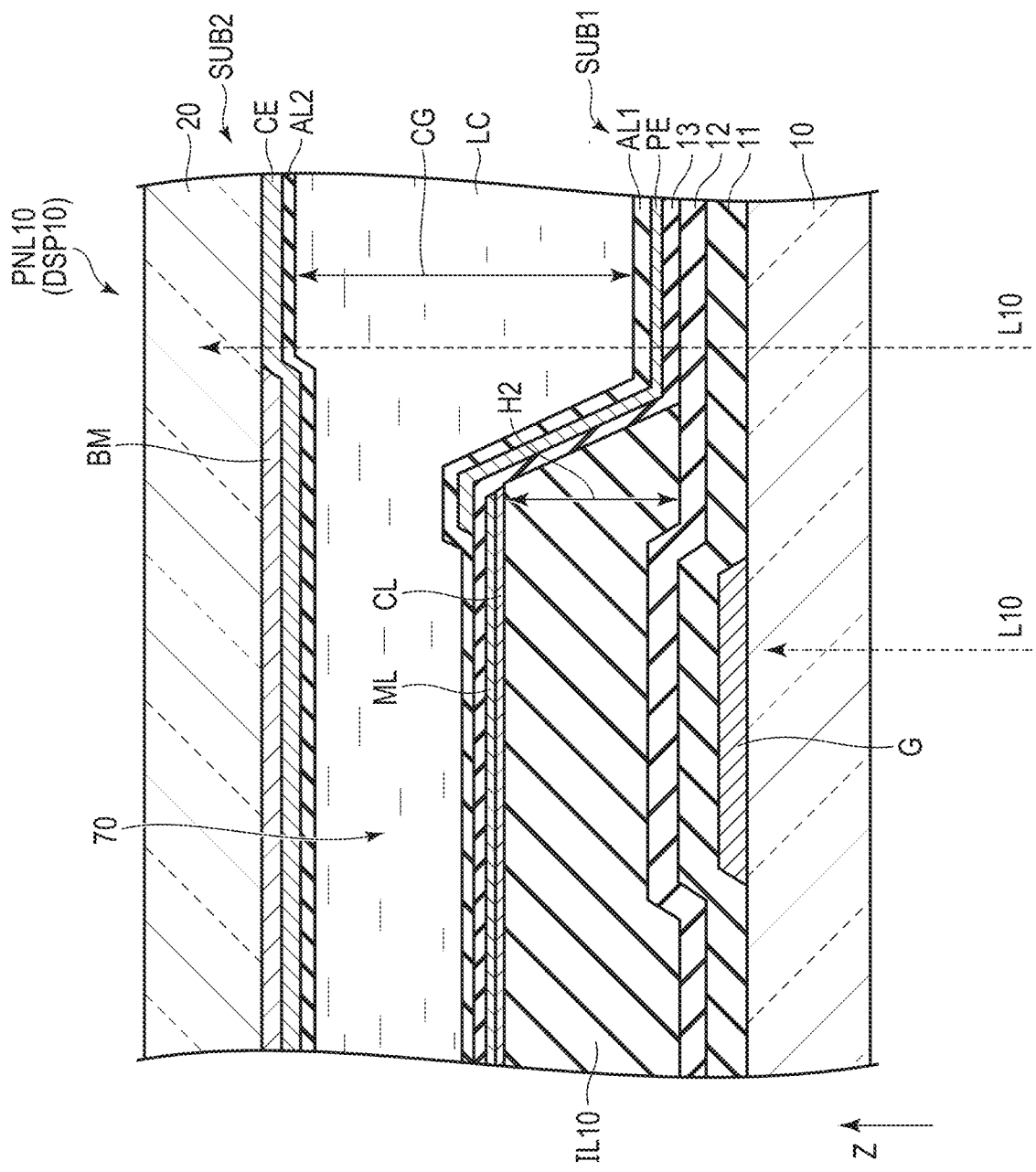
FIG. 11 is a schematic cross-sectional view showing an example of a display panel provided in the display device according to the comparative example.

FIG. 10 and FIG. 11 are schematic cross-sectional views showing an example of the display panel PNL 10 provided in the display device DSP 10 according to the comparative example. As shown in FIG. 10, the display panel PNL 10 has a spacer SP in the vicinity of the switching element SW.

An insulating film IL10 is an element corresponding to the insulating film IL in the present embodiment. The spacer SP is located between the insulating film IL10 and the light-shielding layer BM. The spacer SP is provided under the common electrode CE and is in contact with the alignment film AL1.

In the display panel PNL10, the cell gap CG is formed mainly by the spacer SP. The height HS of the spacer SP is larger than the height H41 of the protruding portion 41 (shown in FIG. 8). The height H2 of the insulating film IL10 in the comparative example is smaller than the height H1 of the insulating film IL in the present embodiment.

A gap 70 is formed above the insulating film IL10, as shown in each of FIG. 10 and FIG. 11. The height H70 of the gap 70 is, for example, approximately 1.0 µm or more (in one example, approximately 1.0 µm to 1.5 µm).

In relation to the height H7 of the gap 7 (shown in FIG. 8), the height H70 of the gap 70 is greater than the height H7 of the gap 7. In the gap 70, the liquid crystal layer LC is located as shown in FIG. 10 and FIG. 11.

It is assumed that the polymer of the liquid crystal layer LC is formed by emitting light L10 (for example, UV) from below the first transparent substrate 10 in the process of manufacturing the display device DSP10. A material forming the liquid crystal layer LC (hereinafter referred to as "liquid crystal material") is located in the gap 70.

The gap 70 overlaps with the scanning line G and the signal line S formed of the metallic material, and the like, in the third direction Z. Therefore, the emitted light does not fully hit the liquid crystal material overlapping with the scanning line G, the signal line S, and the like. As a result, an abnormality may occur in the portion of the liquid crystal layer LC, which is located in the gap 70. The abnormality is, for example, alignment failure of the liquid crystal molecules.

This may cause the light emitted from the light emitting module 100 to be scattered unintentionally, in this portion. For example, as shown in FIG. 11, non-uniformity occurs when the light is scattered in the liquid crystal layer LC located in the gap 70. Such non-uniformity may degrade the display quality in the display device DSP10.

In the display device DSP of the present embodiment, it is possible to set the height H41, which is difficult to set with the spacer SP, by forming the above-described insulating film IL. Accordingly, the height H7 of the gap 7 can be suppressed and the amount of the liquid crystal material that enters the gap 7 can be reduced.

As a result, the liquid crystal material to which the emitted light is not applied can hardly be generated in the manufacturing process, and the occurrence of anomalies in the liquid crystal layer LC is suppressed. Accordingly, unintentional scattering of the light emitted from the light emitting module 100 in the portion can be suppressed, and the display quality can be improved.

In the present embodiment, the display panel PNL does not include a spacer SP (shown in FIG. 11) since the cell gap CG is formed mainly by the protruding portion 41 of the insulating film IL. For this reason, a process of forming the spacer SP does not need to be formed in the process of manufacturing the display device DSP.

In the display device DSP, the manufacturing process can be simplified as compared to the display device DSP10 of the comparative example. Accordingly, costs for manufacturing the display device DSP, and the like can be suppressed. Incidentally, the liquid crystal material located in the aperture OP is arranged in each pixel PX by, for example, a drop method (ODF method) in the manufacturing process.

In the present embodiment, the gap 7 is formed in the area overlapping with the scanning line G, the area overlapping with the signal line S, and the area overlapping with the switching element SW, in the alignment film AL1. In other words, the gap 7 is formed in a grating pattern.

Accordingly, the height H7 of the gap 7 is suppressed at the portion overlapping with the scanning line G, the signal line S, and the switching element SW, which is arranged between the alignment film AL1 and the alignment film AL2. As a result, the display quality can be further improved in the display device DSP.

As described above, according to the present embodiment, the display device DSP capable of improving the display quality can be provided.

In the present embodiment, an example in which the alignment film AL1 includes a contact portion AL13 is disclosed, but the alignment film AL1 may not include a contact portion AL13. In other words, the alignment film AL1 may not be located between the protruding portion 41 and the alignment film AL2. In this case, the protruding portion 41 is in contact with the alignment film AL2. Even in such a case, the above-described advantages can be obtained.

In the present embodiment, an example in which the protruding portion 41 is located near the switching element SW is disclosed, but the protruding portion 41 may be provided in the other portion.

In the present embodiment, the protruding portion 41 is formed integrally when the insulating film IL is formed, but the protruding portion 41 may be formed on the upper surface 51 by patterning the same organic insulating material.

Next, other embodiments will be described. Incidentally, in the other embodiments described below, the same components as those in the above-described first embodiment may be denoted by the same reference numerals as those in the first embodiment, and their detailed description may be omitted or simplified.

Second Embodiment

Figure 12:
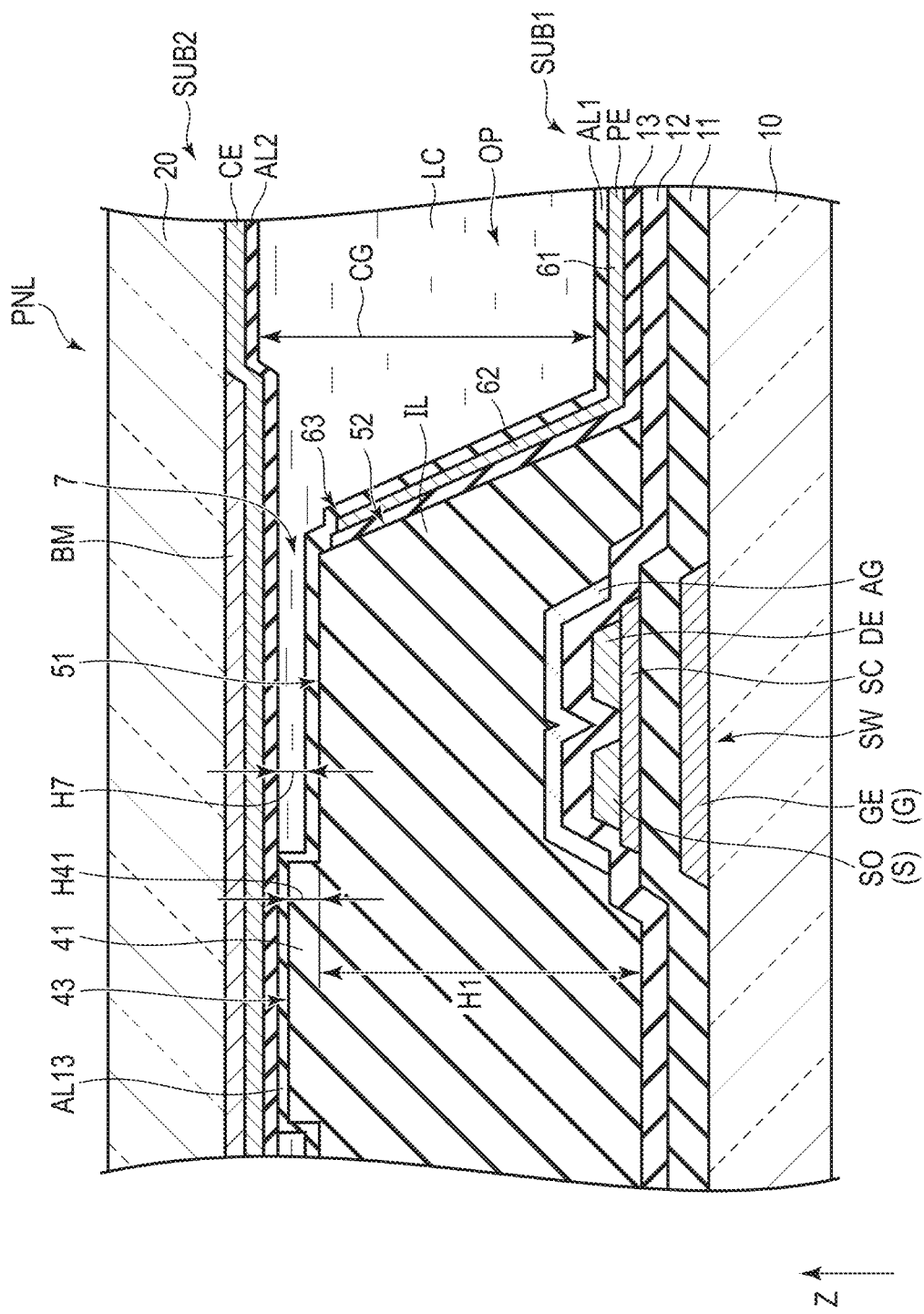
FIG. 12 is a schematic cross-sectional view showing a display panel according to second embodiment.

FIG. 12 is a schematic cross-sectional view showing a display panel PNL according to the present embodiment. The present embodiment is different from the first embodiment in that the first substrate SUB1 does not comprise a power supply line CL or a metal line ML.

An insulating film 13 is not formed in an area overlapping with an upper surface 51. In other words, the insulating film 13 overlaps with the side surface 52 but does not overlap with the upper surface 51. In relation to the upper surface 51 of the insulating film IL, the alignment film AL1 is in contact with the upper surface 51 of the insulating film IL as shown in FIG. 12.

When the insulating film IL of the present embodiment is compared with the insulating film IL of the first embodiment, the height H1 of the insulating film IL of the present embodiment is larger than the height H1 of the insulating film IL of the first embodiment. The height H41 of the protruding portion 41 of the present embodiment is, for example, smaller than the height H41 of the protruding portion 41 of the first embodiment. In one example, the height H41 of the protruding portion 41 of the present embodiment is 0.3 µm or less.

The same advantages as those of the first embodiment can also be obtained from the configuration of the present embodiment. In the present embodiment, the height H7 of the gap 7 can be further suppressed than the height H7 of the gap 7 of the first embodiment. The height H7 of the gap 7 of the present embodiment corresponds to the distance along the third direction Z from the alignment film AL1 to the alignment film AL2, in the area overlapping with the upper surface 51. Although not shown in the drawing, a gap 7 equivalent to the above-described gap is also formed above the scanning line G and the signal line S.

In the present embodiment, since the first substrate SUB1 does not comprise the power supply line CL or the metal line ML, uneven parts that the liquid crystal material may enter can hardly be formed above the upper surface 51. Accordingly, the amount of the liquid crystal material that may enter the gap 7 can be further reduced. As a result, the liquid crystal material to which the emitted light is not applied can hardly be generated in the manufacturing process, and the display quality can be further improved.

Third Embodiment

FIG. 13 is a schematic cross-sectional view showing a display panel PNL according to the present embodiment. The present embodiment is different from the second embodiment in position of the insulating film 13 provided in the first substrate SUB1.

The first substrate SUB1 comprises an insulating film 13 (inorganic insulating film). A switching element SW comprises a semiconductor SC, and an auxiliary gate electrode AG located between the semiconductor SC and the insulating film IL. The semiconductor SC is located directly above a gate electrode GE.

A part of the insulating film 13 is located below the insulating film IL and covers the auxiliary gate electrode AG. More specifically, a part of the insulating film 13 is in contact with the auxiliary gate electrode AG and the insulating film IL.

In relation to a pixel electrode PE, a part of the insulating film 13 is in contact with the pixel electrode PE in the area overlapping with an aperture OP. A side portion 62 of the pixel electrode PE is in contact with a side surface 52. The alignment film AL1 is in contact with an upper surface 51 of the insulating film IL as shown in FIG. 13. A height H41 of a protruding portion 41 of the present embodiment is, for example, substantially equal to the height H41 of the protruding portion 41 of the second embodiment.

The same advantages as those of the second embodiment can also be obtained from the configuration of the present embodiment. In the present embodiment, the insulating film 13 covers the auxiliary gate electrode AG. Moisture can penetrate toward the auxiliary gate electrode AG during the process of manufacturing the display device DSP, and the like.

Such moisture may cause degradation (for example, corrosion) of the auxiliary gate electrode AG formed of the metallic material, and the like. The degradation of the auxiliary gate electrode AG can be suppressed by covering the auxiliary gate electrode AG with the insulating film 13. The reliability of the display device DSP can be thereby improved.

Fourth Embodiment

Figure 14:
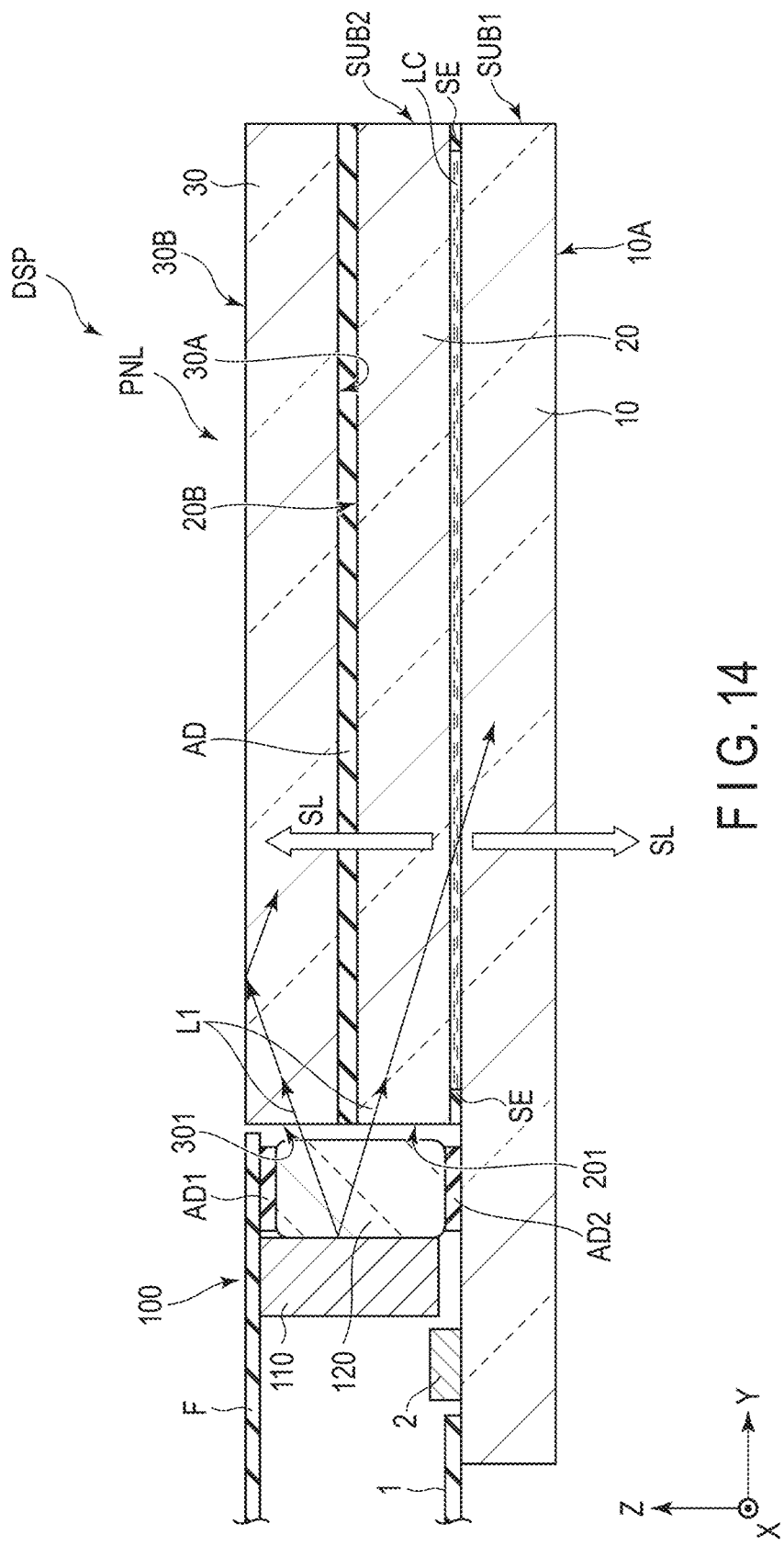
FIG. 14 is a schematic cross-sectional view showing a display device according to a fourth embodiment.

Next, another configuration example of the display device DSP will be described. FIG. 14 is a schematic cross-sectional view showing the display device DSP according to the present embodiment. The only main parts of the display panel PNL are simplified and illustrated in the drawing.

The display panel PNL further comprises a third transparent substrate 30. A main surface 30A of the third transparent substrate 30 faces a main surface 20B of a second transparent substrate 20 in the third direction Z.

An adhesive layer AD adheres the second transparent substrate 20 and the third transparent substrate 30. The third transparent substrate 30 is, for example, a glass substrate, but may be an insulating substrate such as a plastic substrate. The third transparent substrate 30 has a refractive index equivalent to the refractive indexes of the first transparent substrate 10 and the second transparent substrate 20. The adhesive layer AD has a refractive index equivalent to the refractive index of each of the second transparent substrate 20 and the third transparent substrate 30.

A side surface 301 of the third transparent substrate 30 is located directly above a side surface 201 of the second transparent substrate 20. A light emitting element 110 of a light emitting module 100 is electrically connected to a wiring board F. The light emitting element 110 is provided between a first substrate SUB1 and the wiring board F in the third direction Z.

A light guide 120 is provided between the light emitting element 110 and the side surface 201 and between the light emitting element 110 and a side surface 301, in the second direction Y. The light guide 120 is adhered to the wiring board F by an adhesive layer AD1 and is adhered to the first substrate SUB1 by an adhesive layer AD2.

Next, light L1 emitted from the light emitting element 110 will be described.

The light emitting element 110 emits the light L1 toward the light guide 120. The light L1 emitted from the light emitting element 110 propagates along the second direction Y, passes through the light guide 120, and is made incident on the second transparent substrate 20 from the side surface 201, and also made incident on the third transparent substrate 30 from the side surface 301.

The light L1 made incident on the second transparent substrate 20 and the third transparent substrate 30 propagates through the inside of the display panel PNL while repeatedly reflected. The light L1 made incident on the liquid crystal layer LC to which no voltage is applied is not substantially scattered and is transmitted through the liquid crystal layer LC. In addition, the light L1 made incident on the liquid crystal layer LC to which a voltage is applied is scattered by the liquid crystal layer LC. This scattered light SL is emitted from the display panel PNL and is visually recognized as a display image by the user.

The display device DSP can be observed not only from the side of the main surface 10A of the first substrate 10, but also from the side of the main surface 30B of the third transparent substrate 30. Even when the display device DSP is observed from the main surface 10A side or observed from the main surface 30B side, a background of the display device DSP can be observed via the display device DSP.

The display panel PNL of each of the first to third embodiments can be applied to the display device DSP of the present embodiment.

All of the display devices that can be implemented by a person of ordinary skill in the art through arbitrary design changes to the display devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device comprising:
    a first substrate;
    a second substrate overlapping with the first substrate;
    a liquid crystal layer located between the first substrate and the second substrate and containing polymer dispersed liquid crystal; and
    a light emitting element, wherein
    the first substrate comprises:
        a first transparent substrate;
        a scanning line;
        a signal line intersecting the scanning line;
        a switching element electrically connected to the scanning line and the signal line;
        an organic insulating film including an aperture and overlapping with the scanning line, the signal line, and the switching element;
        a pixel electrode overlapping with the aperture and being electrically connected to the switching element;
        a first alignment film overlapping with the organic insulating film and being in contact with the liquid crystal layer; and
        an inorganic insulating film located between the organic insulating film and
    the first alignment film,
    the second substrate comprises:
        a second transparent substrate; and
        a second alignment film overlapping with the second transparent substrate and being in contact with the liquid crystal layer, and
    the organic insulating film includes an upper surface facing the second substrate, and a protruding portion protruding from the upper surface to the second substrate to support the second substrate,
    the organic insulating film further includes a side surface connected to the upper surface to define the aperture,
    the inorganic insulating film overlaps with the side surface and the upper surface, and
    the first substrate further comprises:
        a power supply line located between the upper surface and the inorganic insulating film; and
        a metal line located between the power supply line and the inorganic insulating film and electrically connected to the power supply line.

2. The display device of claim 1, wherein
the first alignment film includes a contact portion which is located between the protruding portion and the second alignment film and which is in contact with the second alignment film.

3. The display device of claim 2, wherein
the contact portion is in contact with the protruding portion.

4. The display device of claim 1, wherein
the metal line has a width smaller than a width of the power supply line.

5. The display device of claim 4, wherein
the power supply line has an aperture through which the protruding portion passes.

6. The display device of claim 1, further comprising:
a second inorganic insulating film, wherein
the switching element comprises a semiconductor, and an auxiliary gate electrode located between the semiconductor and the organic insulating film, and
the second inorganic insulating film is in contact with the auxiliary gate electrode and the organic insulating film.

7. The display device of claim 1, wherein
the first alignment film is in contact with the upper surface.

8. The display device of claim 1, wherein
the pixel electrode includes a side portion facing the side surface.

9. The display device of claim 8, wherein
the side portion includes a distal portion spaced apart from the second alignment film.

10. The display device of claim 1, wherein
the pixel electrode includes a side portion facing the side surface across the inorganic insulating film, and
the side portion includes a distal portion which is spaced apart from the second alignment film and which does not overlap with the power supply line.

11. The display device of claim 1, wherein
a height of the protruding portion is 1.0 µm or less.

12. The display device of claim 1, wherein
the second substrate further comprises a light-shielding layer which is located between the second transparent substrate and the second alignment film and which overlaps with the scanning line, the signal line, and the switching element.

13. The display device of claim 12, wherein
the second substrate further comprises a common electrode which is located between the light-shielding layer and the second alignment film and which is electrically connected to the light-shielding layer.

14. The display device of claim 12, wherein
the light-shielding layer overlaps with the protruding portion.

* * * * *